United States Patent [19]

Clark et al.

[11] Patent Number: 5,327,419

[45] Date of Patent: * Jul. 5, 1994

[54] COMMUNICATION SYSTEM HAVING A MULTIPROCESSOR SYSTEM SERVING THE PURPOSE OF CENTRAL CONTROL

[75] Inventors: Mark W. Clark; Wolfgang Siegmund; Hans-Dieter Wunderlich, all of Munich, Fed. Rep. of Germany

[73] Assignee: Siemens Aktiengesellschaft, Munich, Fed. Rep. of Germany

[*] Notice: The portion of the term of this patent subsequent to Feb. 21, 2006 has been disclaimed.

[21] Appl. No.: 727,977

[22] Filed: Jul. 10, 1991

[30] Foreign Application Priority Data

Jul. 16, 1990 [EP] European Pat. Off. ............ 90113584

[51] Int. Cl.$^5$ ............................................. H04J 3/12
[52] U.S. Cl. ......................................... 370/58.2; 370/67; 370/85.2; 379/269
[58] Field of Search ................. 370/67, 58.2, 85.2; 364/134; 379/269

[56] References Cited

U.S. PATENT DOCUMENTS

| 4,621,318 | 11/1986 | Maeda | 364/134 |
| 4,654,845 | 3/1987 | Mukerji | 370/67 X |
| 4,807,281 | 2/1989 | Weber et al. | 379/269 |

FOREIGN PATENT DOCUMENTS

0274715A3  7/1988  European Pat. Off. ...... H04Q 3/545

Primary Examiner—Douglas W. Olms
Assistant Examiner—Russell W. Blum
Attorney, Agent, or Firm—Hill, Steadman & Simpson

[57] ABSTRACT

Communication system having a multiprocessor system serving the purpose of central control. Multiprocessor systems are used in communication systems for the purpose of central control. Care must thereby be exercised to ensure that the jobs/messages arriving from a periphery according to the FIFO principle are in turn deposited in the original sequence after being handled by processes being executed on the processors. A coordination procedure required for this purpose thereby uses a holding table. The logical sequence of jobs/messages is thus assured during the processing in the multiprocessor system.

15 Claims, 1 Drawing Sheet

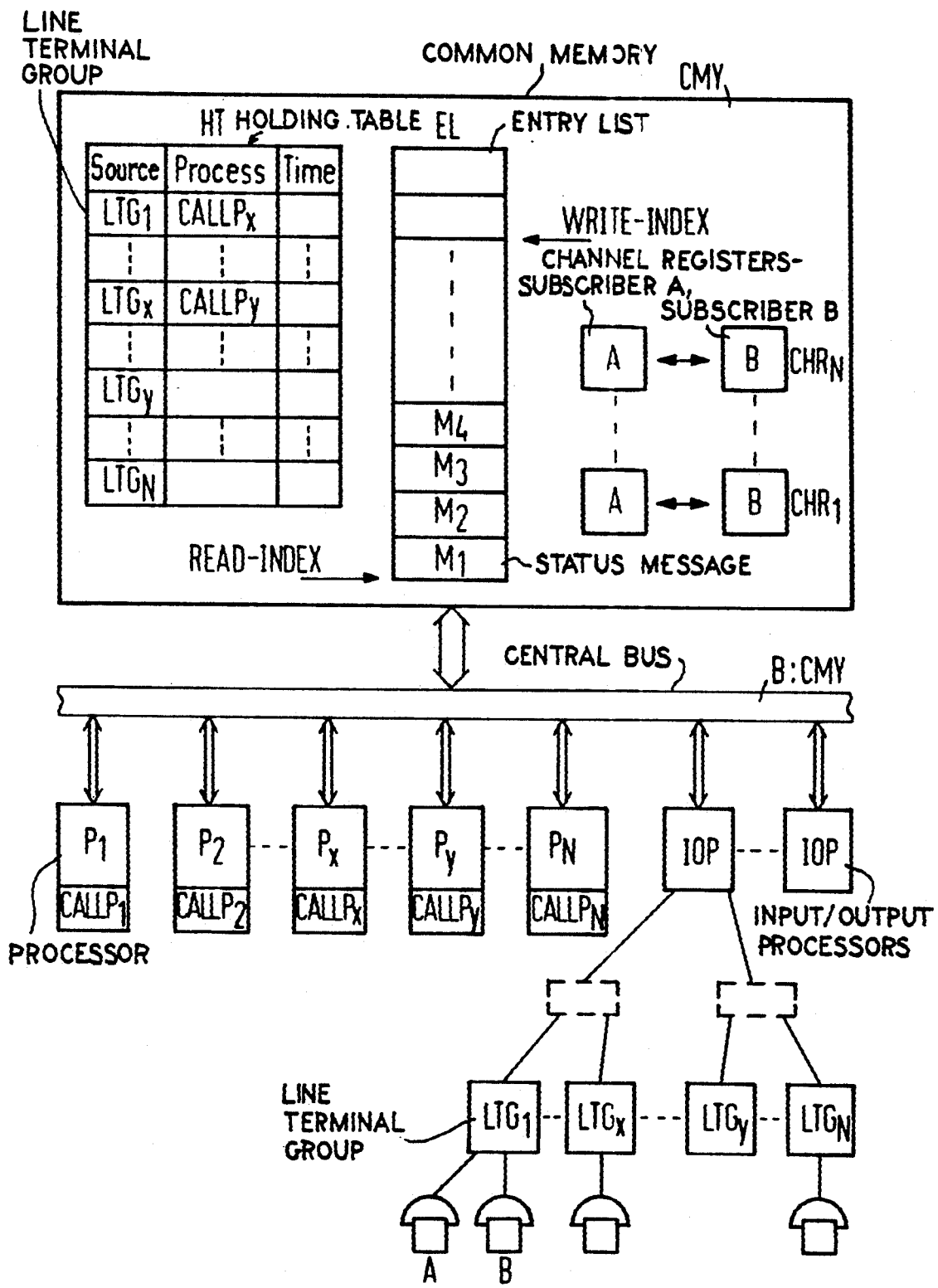

COMMUNICATION SYSTEM HAVING A MULTIPROCESSOR SYSTEM SERVING THE PURPOSE OF CENTRAL CONTROL

BACKGROUND OF THE INVENTION

The present invention is directed to a communication system having terminal equipment connected via line terminal groups as well as a switching matrix network for through-connection of calls and having a multiprocessor system for central control.

During the course of developing more and more complex data processing systems/communication systems, prior art single processing systems were expanded into multiprocessor systems. In contrast to the single processor systems wherein data/status messages are sequentially processed, parallel processing is utilized in multiprocessor systems. Compared to single processor systems, the multiprocessor systems have significant advantages, as indicated, for example, by the great increase in processing speed. The parallel processing of a plurality of tasks is achieved in that a task to be processed is divided into a plurality of sub-tasks, whereby one microprocessor processes respectively one sub-task, and the sub-results are subsequently combined to form an overall result. The sub-tasks are handled on the basis of the processes sequencing at the individual processors. A task/sub-task can thereby be composed of different functional organization sequences in the system. Thus, one process sequencing on a processor handles tasks/sub-tasks of, for example, error correction procedures, time-monitoring procedures or procedures of switching technology. Two or more processes, however, cannot simultaneously handle a sub-task. This is controlled by a monitoring process in the operating system.

What is problematical, however, is that various processes simultaneously access a memory register and can thereby produce undefined conditions. European Patent Application 0 274 715 A3 discloses a method for preventing simultaneous access of two processes to a memory register. By entering a processor number into the appertaining memory registers, the disclosed SECURE procedure prevents simultaneous access of a first process and of a competing, second process to this memory register. This occurs in that the competing, second process only modifies the memory contents of a memory register when a processor number is entered therein. Otherwise, this corresponds to the momentary access of an earlier, first process to that memory register and the competing, second process is entered into a waiting queue behind the first process. As soon as the present access is ended, the competing, second process in the waiting queue is now allowed to access this memory register. A simultaneous access of two processes to a memory register is thus prevented.

In a communication system, all processes are subjected to a hierarchic organizational structure. This is achieved by a prioritization of the process sequence. Thus, for example, a process having a higher priority can interrupt a process having lower priority at any time. When the process with higher priority has ended its task, a process having a lower priority can continue the handling of its original task. In communication systems, such processes having high priority are usually processes for error correction, time monitoring, etc. This, however, means that a process handling a task can be noticeably retarded in terms of its chronological sequence by a process having a higher priority. This is a particular disadvantage in that the sequence of the sub-tasks must be strictly adhered to.

Such a situation is to be avoided under all circumstances. When this situation occurs, the communication system therefore aborts the corresponding connection. One possibility of alleviating this situation is in employing known acknowledgement methods (such as handshaking). These methods can in fact be employed for data processing systems since the user (programmer) can wait a few 100 milliseconds in the least favorable case. In modern communication systems, however, the employment of such methods would lead to such a great load on the central bus system, as well as, on the corresponding processors that the resulting chronological delays could no longer be tolerated.

SUMMARY OF THE INVENTION

An object of the present invention is to provide the communication system having a multiprocessor system for control such that the handling of tasks in the proper sequence is coordinated and chronological delays of a greater extent are thereby avoided. The multiprocessor system is composed of a central system bus to which processors are connected, and a memory system also connected to the central system bus and shared in common by all units of the multiprocessor system. The memory system has at least one entry list for the set up/administration of connections of terminal equipment. The status messages relevant to the connections are intermediately stored in the entry list for further processing by processes being executed on the processors. The object of the present invention is inventively achieved by a system in which the handling of a status message deposited in the entry list and deriving from a source by a first process being executed on a processor is made dependent on a second process handling a status message and being executed on another processor when both status messages derive from the same source. The second process handling its status message deposits an identifier of the source of this message in a holding table created in the common memory system before the beginning of processing and does not in turn erase this identifier until the conclusion of the handling of its message. The first process only begins handling its status message when no entry of the identifier of the same source due to a different process exists in the holding table at this time.

What is important for the present invention is the introduction of the holding table. The exclusive inhibit of the central bus system by a processor for the duration of an access onto the holding table does not mean any limitation of the dynamic loss of the multiprocessor system. The holding procedure thus coordinates the tasks within the system. The time advantage achieved by the parallel handling of the tasks by different processors is disproportionately greater than the slight time loss that arises due to the coordination events themselves (for example, inhibiting the central bus system, placing processors in waiting gueues, etc.).

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single FIGURE depicts a modularly structured multiprocessor system that coordinates decentralized processor units of a communication system.

DESCRIPTION OF THE PREFERRED EMBODIMENT

The present invention has general applicability, but is most advantageously utilized in a system as depicted in the single FIGURE. In general terms the multiprocessor system has the following elements:

central system bus B:CMY;

a plurality of processor units $P_1 \ldots P_n$ connected thereto;

a plurality of input/output processors IOP whereby a plurality of line terminal groups $LTG \ldots LTG_n$ are connected to at least one of these input/output processors IOP; and a memory system CMY connected to the central system bus and shared in common by all units of the multiprocessor system.

The fundamental functioning can be set forth in greater detail with reference to a connection between two subscribers A, B. The two subscribers are thereby respectively connected to one of the line terminal groups $LTG_1 \ldots LTG_n$. Four different status messages $M_1 \ldots M_4$ are required for the call setup/call cleardown between two subscribers A, B as follows:

$M_1$: SEIZURE;

$M_2$: digit block (select);

$M_3$: SETUP (call set up in the switching matrix network, ringing the B-subscriber, etc. ); and $M_4$: RELEASE.

The status messages are deposited according to the FIFO principle in an entry list EL situated in the common memory system CMY and are serviced onto the processes $CALLP_1 \ldots CALLP_n$ allocated to the processors $P_1 \ldots P_n$. What are referred to as channel registers $CHR_1 \ldots CHR_n$ are also allocated to a connection. Parameters about the respective status of a connection are deposited therein (for example, to which line terminal group $LTG_x$ the subscriber is connected or which switching matrix network is involved in the connecting circuit).

As an example, let the subscribers A, B be connected to the line terminal group $LTG_x$. The subscriber A picks up the receiver of his terminal equipment. He thereby informs the communication system of a desired connection to what is still an unknown subscriber B. The seizure of the receiver initiates the system to write the corresponding status message $M_1$ into the entry list EL provided for this purpose and situated in the common memory system CMY. Subsequently, the subscriber A attempts to select the number of the subscriber B. This initiates the system to write a corresponding status message $M_2$ into the entry list EL. An analogous procedure occurs for the status messages $M_3$, $M_4$ of this connection as well as for the status messages of other connections. Further, all processes $CALLP_1 \ldots CALLP_n$ allocated to the processors $P_1 \ldots P_n$ are in an active or passive condition depending on whether or not there are corresponding call requests on the part of the subscribers.

After a status message has been successfully handled, a process is answered back at the operating system. The operating system assigns the process that has become free the handling of a new status message. In the exemplary embodiment, this is to be the status message M1, denoting that $M_1$ is handled by the process $CALLP_x$. A second process $CALLP_y$ that has become free should handle the status message $M_2$ at the same time. Another process having a higher priority can then interrupt, for example, the process $CALLP_x$. This denotes that the result of the status message $M_1$ can only be deposited in the relevant memory registers (for example, the channel register) at a correspondingly later time. As a result the status messages $M_1 \ldots M_n$ originally deposited in the entry list EL according to the FIFO principle are now deposited in the corresponding memory registers in the inverse sequence after they are handled. This sequence, however, is the basis for further handlings. In many instances, however, it now no longer represents an intrinsically logical sequence of status messages. For example, the call set up is characterized in that a status message $M_1$ (seizing the receiver) is followed by a status message $M_2$ (selecting). An inversion of this sequence, however, contradicts the logical completion of a call setup, this intrinsically leading to an immediate abort of this connection. Such an abort can be avoided by using the holding table HT in the common memory system CMY.

The status messages $M_1 \ldots M_n$ of a connection from a source $LTG_x$ are thereby especially affected in view of possible chronological delays since the immediate succession of two status messages of the entry list EL here involves a higher probability of the inversion of the sequence.

Before it handles a status message $M_x$, every process $CALLP_x$ that is just activated must therefore verify the origin of the status message, i.e. the line terminal group $LTG_x$ in this example. This is carried out by analyzing the message overhead of the corresponding message that contains the source location. Subsequently, the associated process $CALLP_x$ that has just been activated enters the identifier of the source of the message into the holding table HT. The entry occurs only in case no other message of the same source is being handled at the same time, i.e. when no identifier of the same source resides in the holding table HT. Otherwise, the associated process $CALLP_x$ assumes the handling of the next message residing in the entry list EL. When, however, no identifier of the same source is contained, then the associated process $CALLP_x$ also additionally inscribes the holding table HT with its own process-associated identifier, as well as, with a time-monitoring parameter that shall be discussed later. After the status message $M_x$ has been successfully handled, the process $CALLP_x$ erases the identifier of the source in the holding table HT, wherewith another process $CALLP_y$ that has just been activated can handle a status message $M_y$ of the source $LTG_x$.

What this method assures is that only one message of a source is handled at one time and, consequently, an inversion of the sequence of handled messages is prevented.

The entry list EL is deposited in a reserved memory area of the memory system CMY. The start is marked by a read character READ-INDEX and the end is marked by a write character WRITE-INDEX. The read index is used by the process $CALLP_x$ for handling the message $M_x$ and is only incremented when a message $M_x$ is read out by the process $CALLP_x$. The read index remains unmodified in the "look ahead" reading due to the holding procedure.

It follows from the above procedure that gaps can arise in the entry list EL as a result of the holding procedure. It can thus have messages and empty list elements in an arbitrary sequence between the read index and the write index. When the read index READ-INDEX then indicates an empty list element even though further messages are present and when the write index WRITE-INDEX has not yet been fetched, the read index READ-INDEX is incremented until a list element that is not empty (i.e. a message) is encountered.

In order to avoid a simultaneous access of two processes $CALLP_x$ and $CALLP_y$ to the memory location in the holding table HT that contains the identifier of the source, the process that is the first to access inhibits the central bus system B:CMY for the duration of its access. The access of all other equipment connected to the central bus system B:CMY is thus blocked to the central bus system B:CMY. The inhibit of the central bus system B:CMY occurs on the basis of a processor command provided for this purpose.

When one of the processors $P_1 \ldots P_n$ is down, this has immediate effects on the process $CALLP_x$ just sequencing therein. Due to the holding procedure, the outage of a process just being executed results in the identifier of the source remaining set in the holding table HT and is no longer erased. This would mean that all connections proceeding from subscribers that are connected to the corresponding source (line terminal group) are interrupted because the appertaining messages can no longer be handled. Processes for time monitoring are implemented in the operating system in order to avoid this. These time monitoring processes update the processes $CALLP_1 \ldots CALLP_n$ being execute on the processors $P_1 \ldots P_n$ with a corresponding timing. During the course of the entry of the identifier of the source as well as of the process identifier into the holding table HT, the associated process $CALLP_x$ then also additionally enters a time parameter. The process implemented in the operating system for time monitoring compares this time parameter to prescribed rated values in a fixed chronological timing and then in turns implements the removal of an identifier that is still set due to the malfunction of an equipment and, thus, has not yet been erased, the processing of the corresponding messages being enabled again.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. In a communication system having a plurality of terminal equipment connected via a plurality of line terminal groups as well as a switching matrix network for through-connection of calls, at least one terminal equipment of the plurality of terminal equipment and one line terminal group of the plurality of line terminal groups forming a source, and having a multiprocessor system for central control, the multiprocessor system having a central system bus to which a plurality of processors are connected, one of said plurality of processors operatively connecting said one line terminal group to said central system bus a memory system also connected to the central system bus and shared in common by all units of the multiprocessor system, said memory system having at least one entry list for the set up/administration of connections of the terminal equipment, a plurality of status messages relevant to the connections being intermediately stored in said entry list for further processing by a plurality of processes being executed on the plurality of processors, respectively, a method comprising the steps of: handling of a first status message of the plurality of status messages stored in the entry list and deriving from the source by a first process of the plurality of processes executed on a respective first processor of the plurality of processors being made dependent of a second process of the plurality of processes handling a second status message of the plurality of status messages and being executed on a second processor of the plurality of processors when both the first and second status messages derive from the same source; the second process handling the second status message storing an identifier of the source of the second message in a holding table created in the common memory system before a beginning of processing and the second process not in turn erasing the identifier until a conclusion of the handling of the second message; and the first process only beginning to handle the first status message when no entry of the identifier of the source due to a different process of the plurality of processes exists in the holding table at this time.

2. The method according to claim 1, wherein one process of the plurality of processes prevented from handling a status message of the plurality of status messages assumes the handling of another status message of the plurality of status messages that is stored next in the entry list.

3. The method according to claim 1, wherein the communication system further comprises a time monitoring of the plurality of processes executed on the plurality of processors, respectively, that effects an automatic erasure of the identifier in the holding table after a permanently prescribed time interval.

4. The method according to claim 1, wherein on the basis of an exclusive reservation of the central system bus for a time interval of an access by one process of the plurality of processes activated at a point in time to the holding table, a simultaneous access to the holding table by a further, competing process of the plurality of processes activated at the point in time is prevented.

5. The method according to claim 1, wherein the communication system further comprises a read procedure and write procedure for reading and writing, respectively, the plurality of status messages into and out of, respectively, the entry list and that uses a read index and write index, respectively, and wherein the read procedure is controlled such that the read index skips gaps in the entry list that have occurred due to an erasure of an identifier in the holding table.

6. In a communication system having a plurality of terminal equipment connected via at least a plurality of line terminal groups for through-connection of calls, at least one terminal equipment of the plurality of terminal equipment and one line terminal group of the plurality of line terminal groups forming a source, and having a multiprocessor system for central control, the multiprocessor system having a central system bus to which a plurality of processors are connected, a memory system also connected to the central system bus and shared in common by at least the plurality of processors of the multiprocessor system, said memory system having at least one entry list for the set up/administration of connections of the terminal equipment, a plurality of status messages relevant to the connections being intermediately stored in said entry list for further processing by a plurality of processes that are executed on the plurality of processors, a method having the steps of:

making dependent a handling of a first status message of the plurality of status messages stored in the entry list, the first status message being derived from the source by a first process of the plurality of processes executed on a respective first processor of the plurality of processes, on a second process of the plurality of processes handling a second status message that is executed on a second processor of the plurality of processors, when both the first and second status messages are derived from the source;

storing by the second process handling the second status message an identifier of the source of the second message in a holding table created in the common memory system before a beginning of processing and the second process not erasing the identifier until a conclusion of the handling of the second message; and the first process only beginning handling the first status message when no entry of the identifier of the source due to a different process of the plurality of processes exists in the holding table.

7. The method according to claim 6, wherein one process of the plurality of processes prevented from handling one status message of the plurality of status messages assumes the handling of another status message of the plurality of status messages that resides next in the entry list.

8. In a communication system having a plurality of terminal equipment connected via at least a plurality of line terminal groups for through-connection of calls, at least one terminal equipment of the plurality of terminal equipment and one line terminal group of the plurality of line terminal groups forming a source, and having a multiprocessor system for central control, the multiprocessor system having a central system bus to which a plurality of processors are connected, a memory system also connected to the central system bus and shared in common by at least the plurality of processors of the multiprocessor system, said memory system having at least one entry list for the set up/administration of connections of the terminal equipment, a plurality of status messages relevant to the connections being intermediately stored in said entry list for further processing by a plurality of processes that are executed on the plurality of processors, a method having the steps of:

making dependent a handling of a first status message of the plurality of status messages stored in the entry list, the first status message being derived from the source by a first process of the plurality of processes executed on a respective first processor of the plurality of processes, on a second process of the plurality of processes handling a second status message that is executed on a second processor of the plurality of processors, when both the first and second status messages are derived from the source;

storing by the second process handling the second status message an identifier of the source of the second message in a holding table created in the common memory system before a beginning of processing and the second process not erasing the identifier until a conclusion of the handling of the second message;

the first process only beginning handling the first status message when no entry of the identifier of the source due to a different process of the plurality of processes exists in the holding table; and time monitoring the plurality of processes being executed on the plurality of processors, respectively, such that an automatic erasure of the identifier in the holding table occurs after a predetermined time interval.

9. The method according to claim 6, wherein on the basis of an exclusive reservation of the central system bus for a time interval of an access by one process of the plurality of processes activated at a point in time to the holding table, a simultaneous access to the holding table by a further, competing process of the plurality of processes activated at the point in time is prevented.

10. In a communication system having a plurality of terminal equipment connected via at least a plurality of line terminal groups for through-connection of calls, at least one terminal equipment of the plurality of terminal equipment and one line terminal group of the plurality of line terminal groups forming a source, and having a multiprocessor system for central control, the multiprocessor system having a central system bus to which a plurality of processors are connected, a memory system also connected to the central system bus and shared in common by at least the plurality of processors of the multiprocessor system, said memory system having at least one entry list for the set up/administration of connections of the terminal equipment, a plurality of status messages relevant to the connections being intermediately stored in said entry list for further processing by a plurality of processes that are executed on the plurality of processors, a method having the steps of:

making dependent a handling of a first status message of the plurality of status messages stored in the entry list, the first status message being derived from the source by a first process of the plurality of processes executed on a respective first processor of the plurality of processes, on a second process of the plurality of processes handling a second status message that is executed on a second processor of the plurality of processors, when both the first and second status messages are derived from the source;

storing by the second process handling the second status message an identifier of the source of the second message in a holding table created in the common memory system before a beginning of processing and the second process not erasing the identifier until a conclusion of the handling of the second message;

the first process only beginning handling the first status message when no entry of the identifier of the source due to a different process of the plurality of processes exists in the holding table; and providing a read procedure and write procedure for reading and writing, respectively, the plurality of status messages into and out of, respectively, the entry list using a read index and write index, respectively, and controlling the read procedure such that the read index skips gaps in the entry list that have occurred due to an erasure of an identifier in the holding table.

11. A communication system having a plurality of terminal equipment connected via at least a plurality of line terminal groups for through-connection of calls, at least one terminal equipment of the plurality of terminal equipment and one line terminal group of the plurality of line terminal groups forming a source, and having a multiprocessor system having a plurality of processors for central control, one of said plurality of processors being operatively connected to said one line terminal group, the multiprocessor system comprising:

a central system bus connected to the plurality of processors;

a memory system connected to the central system bus and shared in common by at least the plurality of processors of the multiprocessor system, said memory system having at least one entry list for the set up/administration of connections of the terminal equipment, a plurality of status messages relevant to the connections being intermediately stored in said entry list for further processing by the plurality of processes that are executed on the plurality of processors, respectively;

means for making dependent the handling of a first status message of the plurality of status messages stored in the entry list, the first status message being derived from the source by a first process of the plurality of processes that is executed on a first processor of the plurality of processors, on a second process of the plurality of processes handling a second status message, the second process being executed on a second processor of the plurality of processors, when both the first and second status messages derive from the source;

means for depositing by the second process handling the second status message an identifier of the source of the second message in a holding table created in the common memory system before a beginning of processing; and means for not erasing the identifier by the second process until a conclusion of the handling of the second message, the first process only beginning handling the first status message when no entry of the identifier of the same source due to a different process of the plurality of processes exists in the holding table.

12. The communication system according to claim 11, wherein the communication system further comprises means for assuming, when one process of the plurality of processes is prevented from handling one status message of the plurality of status messages, the handling of another status message of the plurality of status messages that resides next in the entry list.

13. The communication system according to claim 11, wherein the communication system further comprises a means for time monitoring of the plurality of processes being executed on the plurality of processors, respectively, such that an automatic erasure of the identifier in the holding table occurs after a predetermined time interval.

14. The communication system according to claim 11, wherein the communication system further comprises, on the basis of an exclusive reservation of the central system bus for a time interval of an access by one process of the plurality of processes activated at a point in time to the holding table, means for preventing simultaneous access to the holding table by a further, competing process of the plurality of processes activated at the point in time.

15. The communication system according to claim 11, wherein the communication system further comprises means for providing a read procedure and write procedure for reading and writing, respectively the plurality of status messages into and out of, respectively, the entry list using a read index and a write index, respectively, and means for controlling the read procedure such that the read index skips gaps in the entry list that have occurred due to an erasure of an identifier in the holding table.

* * * * *